(12) United States Patent
Tsarev

(10) Patent No.: US 6,836,601 B2
(45) Date of Patent: Dec. 28, 2004

(54) BEAM-EXPANDING DEVICE

(76) Inventor: Andrei Vladimirovich Tsarev, P.O. Box 662, Novosibirsk, 630117 (RU)

( * ) Notice: Subject to any disclaimer, the term of this patent is extended or adjusted under 35 U.S.C. 154(b) by 152 days.

(21) Appl. No.: 10/333,483
(22) PCT Filed: Mar. 30, 2001
(86) PCT No.: PCT/RU01/00129
§ 371 (c)(1), (2), (4) Date: Jan. 17, 2003
(87) PCT Pub. No.: WO02/06873
PCT Pub. Date: Jan. 24, 2002

(65) Prior Publication Data
US 2003/0169969 A1 Sep. 11, 2003

(30) Foreign Application Priority Data
Jul. 19, 2000 (RU) ........................................ 2000119266

(51) Int. Cl.[7] ................................................ G02B 6/26
(52) U.S. Cl. ............................. 385/47; 385/39; 359/618
(58) Field of Search ............................. 385/27, 43, 47; 372/98

(56) References Cited

U.S. PATENT DOCUMENTS

| 4,087,159 A | * | 5/1978 | Ulrich | 385/129 |
| 4,715,672 A | * | 12/1987 | Duguay et al. | 385/129 |
| 4,740,048 A |  | 4/1988 | Mori | 350/96.15 |
| 5,101,413 A | * | 3/1992 | Botez | 372/50 |
| 5,349,602 A |  | 9/1994 | Mehuys et al. | 372/98 |

FOREIGN PATENT DOCUMENTS

DE  34 13 704 A1  10/1985  ............ G02B/6/14

OTHER PUBLICATIONS

"Guided–Wave Holographic Grating Beam Expander–Fabrication and Performance", Electronics Letters, IEE Stevenage, GB, vol. 17, No. 4, Feb. 19, 1981, pp. 165–167.

* cited by examiner

Primary Examiner—Akm Enayet Ullah
Assistant Examiner—Jennifer Doan
(74) Attorney, Agent, or Firm—Allen, Dyer, Doppelt, Milbrath & Gilchrist, P.A.

(57) ABSTRACT

A radiation beam expander includes planar optical waveguide (2) and stripe waveguide (3) provided with a set of unit reflectors (4) that overlap its aperture, and is arranged in the plane of planar waveguide (2), within said waveguide itself or in the vicinity thereof, with providing the possibility of transition of light beams (6'), reflected by unit reflectors (4), into planar waveguide (2). Angle of inclination and arrangement of unit reflectors (4) being selected such that phase difference on the operating radiation wavelength, for any pair of beams (6') reflected from different unit reflectors (4), is essentially multiple of $2\pi$.

3 Claims, 2 Drawing Sheets

BEAM-EXPANDING DEVICE

FIELD OF THE INVENTION

The invention relates to optics, and particularly concerns an optical beam expander.

PRIOR ART

Known is an expander of an optical beam propagating in a planar optical waveguide, which expander includes a waveguiding lens (see, e.grating. Y. Abdelrezak, Chen S. Tsai and T. Q. Vu. An Integrated Optic RF Spectrum Analyzer in ZnO—GaAs—AlAsAs Waveguide, J. Lightwave Technology, 1990, Vol. 8, No. 12, pp. 1833–1837). The device operates similarly to a standard light beam collimator implemented on a volume lens. A small-size optical radiation source is positioned in focus of a planar lens, the light from which source first is expanded due to the diffraction divergence, and then the light is collimated by the planar lens. Irrespective of a possible type of the used waveguiding lenses (Fresnel, Luneberg, geodetic lenses, etc.), this device is characterized with large dimensions due to both geometric sizes of lenses themselves and a great length (not less than focal distance of lenses themselves) that is required to form a sufficiently broad and well-collimated light beam.

Also known is a beam expander (V. Neumann, C. W. Pitt, L. M. Walpita, Guided-wave holographic grating beam expander—fabrication and performance, Electronics Letters, 1981, v. 17, No. 4, p. 165–166), wherein an optical beam in a waveguide is expanded using the Bragg diffraction grating. This device includes a planar optical waveguide and a beam expanding means in the waveguide plane, which means is disposed on the path of the radiation beam and is a diffraction grating having a very small spacing, grooves of which grating are implemented on the optical planar waveguide surface at the angle that is equal to Bragg angle ($\theta_B$) as measured in respect of the incident light beam:

$$\sin\theta_B = K/2k \qquad (1)$$

where $K=2\pi/\Lambda$, $\Lambda$ is diffraction grating spacing, $k=2\pi N/\lambda_0$ is constant value of propagation of light in a waveguide, $\lambda_0$ is light wavelength in vacuum, N is effective refractive index of the guided mode of the optical waveguide.

This device is capable of providing deflection by 90 degrees of a narrow (less than 1 mm) light beam that is incident onto the diffraction grating at Bragg angle. Width of the expanded beam can be 5–10 mm. The width depends on parameters of the interacting waves and diffraction grating. In the known device, the diffraction grating on a glass waveguide was manufactured by the method of ion etching through a photoresist mask illuminated by a holographic technique by superposition of two optical beams. The grating had spacing of 0.6 $\mu$m and was 0.3 nm deep. That approach provided the diffraction efficiency of 16% for the guided mode, with effective refractive index of 1.536 at the helium-neon laser wavelength.

But the discussed device has the following disadvantages: the high divergence of the outputted light beam, which divergence is determined by divergence of the incident light beam having a narrow aperture, as well as the spatial inhomogeneity of the expanded beam, which inhomogeneity is caused by the technical difficulty of fabrication of diffraction gratings of sub-micron sizes on a large aperture. This limitation is a principal one in terms of the practical use of a beam expander in acousto-optical (AO) devices for processing and transmitting data, e.g. AO spectrum analyzers, tunable filters, etc. In such devices, the optical beam divergence determines such important parameter as the number of resolvable spots.

SUMMARY OF THE INVENTION

The invention is basically directed to the object of developing of a beam expander that will have the minimal dimensions and, simultaneously, a low divergence of the outputted optical radiation.

Said object is to be solved as follows: in a radiation beam expander that includes a planar optical waveguide and a beam expanding means in the planar waveguide plane, which means is disposed on the path of the radiation beam: according to the invention—the beam expanding means is implemented in the form of a stripe waveguide provided with a set of unit reflectors that overlap its aperture, and which is disposed in the planar waveguide plane either within said waveguide, or in the vicinity thereof, with providing of possibility of transition of the radiation beams, reflected by the unit reflectors, into the planar waveguide, the inclination angle and relative position of the unit reflectors being selected such that the phase difference at the operating radiation wavelength, for any pair of beams reflected from different unit reflectors, is essentially multiple of $2\pi$.

To ensure an essential suppression (over 20–30 dB) of sidelobes of the outputted optical radiation's directivity pattern, the unit reflectors are advantageously implemented as having different reflectance, whose value diminishes from the middle portion of a stripe waveguide to its ends.

In the preferable embodiment, angle of inclination of the unit reflectors with respect to the longitudinal axis of a stripe waveguide is selected to be essentially 45°.

BRIEF DESCRIPTION OF DRAWINGS

The invention is further described by examples of its particular embodiments, taken in conjunction with the accompanying drawings, wherein.

BEST MODES OF EMBODIMENT

Figure 1:
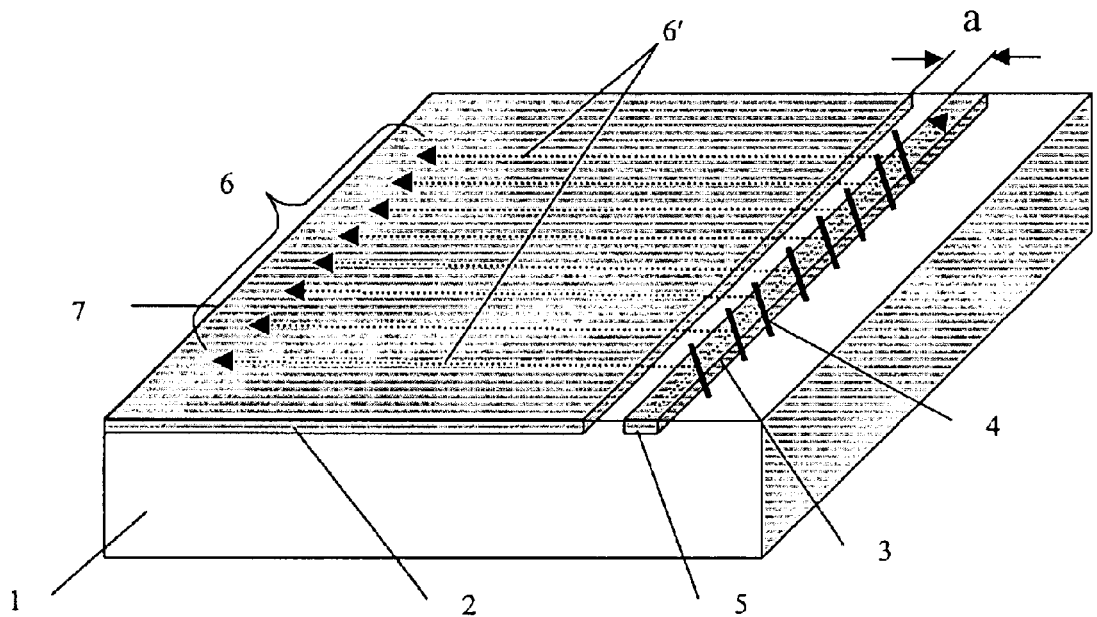
FIG. 1 shows a beam expander having a stripe waveguide in the vicinity of a planar waveguide, according to the invention, isometry.
Figure 2:
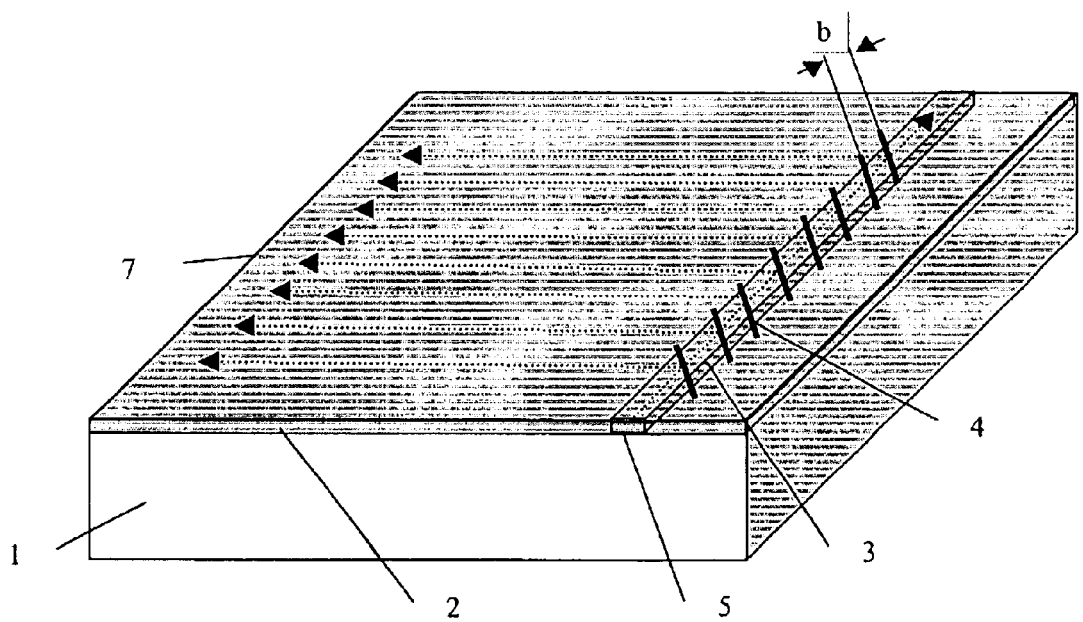
FIG. 2 shows the same expander as of FIG. 1, wherein a stripe waveguide is disposed in a planar waveguide.

A thin layer, several micrometers thick and having refractive index that is greater than that of the environments (substrate and ambient upper layer of, in this case, air), is implemented upon solid-state substrate 1 (FIGS. 1, 2). Said layer is planar optical waveguide 2, wherein a light beam can propagate within said layer with very low losses (less than 1 dB/cm). The number of the guided (waveguiding) waves (modes) supported by this structure, and the spatial distribution of their guided modes are determined by the profile of change of refractive index in depth.

In the plane of planar optical waveguide 2, within said waveguide (FIG. 2) or near it (FIG. 1), stripe optical waveguide 3 is implemented. As compared with refractive index of planar waveguide 2, stripe optical waveguide 3 has the higher refractive index value not only in depth, but also in the transverse direction of the structure. Thus said waveguide is able to maintain propagation of a narrow and non-divergent optical beam along its axis in the region of an increased refractive index value. The stripe waveguide 3 is oriented in parallel to the lateral edge of planar waveguide 2 and is a local region on, or over the solid-state surface in the form of a thin film, several microns or tens microns wide, having refractive index exceeding that of its environment. Waveguides 2 and 3 can be manufactured using the following techniques: diffusion of metals, proton exchange from salt melts, sputtering of the substances that have a greater refractive index that that of substrate 1, modification of the surface layer properties by radiation, e.g. by electrons and/or photons, epitaxy from gaseous or liquid phase, etc.

Within the region occupied by stripe optical waveguide 3, provided is a set of inclined unit linear reflectors 4 that overlap the aperture of stripe optical waveguide 3. The optical beam to be expanded is inputted into stripe optical waveguide 3 via input 5, for example, via polished edge. From input 5 the light further passes through stripe waveguide 3 and, encountering unit reflectors 4, is splits into a large number of coherent light beams that transit into planar optical waveguide 2 and form the slightly-diverging expanded output beam 6 that is directed to exit 7. When stripe optical waveguide 3 is implemented in the nearest vicinity—at distance "a"—from planar optical waveguide 2 (FIG. 1), reflected light beams 6' are tunnelled through the (distance "a") that separates them and has a lower refractive index. For the purpose to reduce the optical losses of the device, width of said region must be sufficiently great so that the incident optical fields of modes of stripe waveguide 3 would not reach planar waveguide 2 (i.e. the radiation attenuation must be eliminated). On the other hand, said distance "a" must be sufficiently small to let tunnelling of the waveguiding mode therethrough. In this aspect, the compromise is the value of separating region "a" that is equal, in an order of magnitude, to width of stripe optical waveguide 3 itself, i.e. about 5–20 μm. When stripe optical waveguide 3 is implemented directly in planar optical waveguide 2 (see FIG. 2), the reflected light beams simply passing from one waveguide to another, thereby intersecting the separating boundary therebetween with negligible losses.

Figure 3:
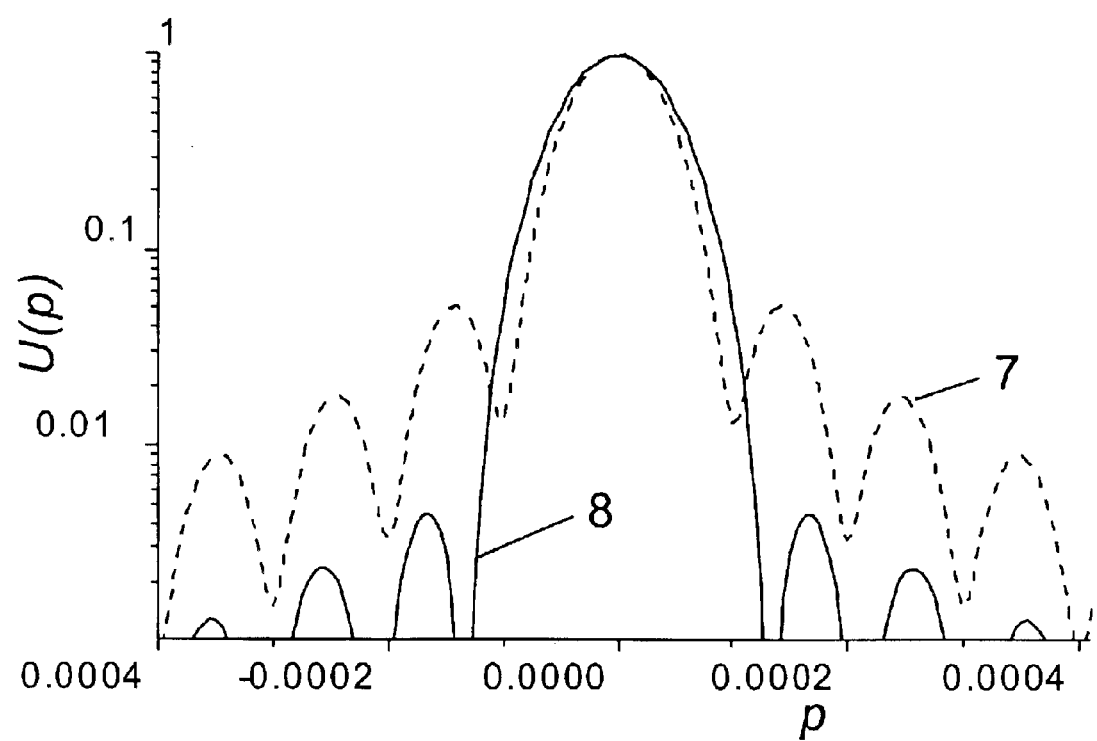
FIG. 3 shows relationship between the beam expander radiation amplitude and direction of the reflected beam in the planar waveguide plane.

To provide the maximum expansion of the optical beam, inclination of reflectors 4 is selected such that the reflected beam is deviated at the angle approximate to the right angle (i.e. unit reflectors 4 must be inclined at the angle about 45 degrees with respect to the longitudinal axis of the stripe optical waveguide). However, generally the inclination may be arbitrary one, basing on the structure of the particular device. By varying reflectance R and number "M" of reflectors 4, both the angular divergence of outputted beam 6 and the sidelobe level can be changed. In particular, FIG. 3 shows angular spectra of beam expanders having aperture of 0.7 cm for two typical cases. Curve 7 corresponds to the constant reflectance for all reflectors 4, and curve 8 corresponds to the case when unit reflectors 4 have different reflectances whose value decreases from the middle portion of stripe optical waveguide 3 towards its ends; in this case—in accordance with the truncated Gaussian function. The form of the angular spectrum, in particular its angular divergence and sidelobe level, are depend on particular type of the function according to which reflectance of reflectors 4 will be changing. But the common trend of decrease of the sidelobe levels will be maintained for any type of the reflectance value decrease function—from the centre part of stripe waveguide 3 to its ends.

Reflectors 4 can be in the form of local regions as narrow (about 0.2–2 μm) strip having altered optical properties, for example due to the proton exchange, ion implantation, etc., and also shaped as grooves or steps (about 10–1000 nm high) made of the same or other material on the optical waveguide 3 surface. Reflectance R of a unit reflector 4 is in general 0.005÷0.0001 and can be controlled by selection of a manufacture process and reflector 4 geometry. Number of reflectors 4 must be sufficiently great (in general, product R*M is over 2, i.e. M is approximately 500÷1000), so that good collimating properties (a narrow directivity and an high level of suppression of sidelobes in angular space) and the high efficiency of transformation from a narrow beam into a broad one could be obtained. The distance "b" between unit reflectors 4 is usually comparable with width of optical waveguide 3 (about 5÷20 μm).

The device operates as follows. A narrow optical beam is inputted into stripe optical waveguide 3 through input 5; said beam at each of unit reflectors 4 is divided into two beams. One beam (having a significantly smaller intensity) is reflected and transits from stripe optical waveguide 3 into planar optical waveguide 2, and the other beam (of a greater intensity, slighty less intense than the incident one) passes through stripe optical waveguide 3 to the next unit reflector 4, whereon it is divided again into two beams, and so on. All reflected beams 6' are summed taking into account the optical phase shift caused by a delay of the light beam in the interval between adjacent reflectors 4. Owing to the fact that on the operating light wavelength the phase difference for beams 6', reflected from different unit reflectors 4 and transiting from stripe optical waveguide 3 into planar optical waveguide 2, is selected to be multiple of $2\pi$, then all reflected beams 6' are summed coherently. The resulting light beam 6 has a greater width (hundreds and thousands times greater than the inputted one) and a low divergence of the outputted optical radiation, caused by constancy of the phase front of the optical wave in the transverse direction of stripe waveguide 3, as well as caused by a strictly predetermined inclination and position of a great number of unit reflectors 4.

The basic difference between the proposed beam expander and the beam expander having a holographic diffraction grating should be emphasized. In the latter device, the light is incident on the holographic diffraction grating at Bragg angle and is deviated in the first diffraction order. The reason is that its is necessary to provide a diffraction grating having a very small spacing (fractions of micron) that is fabricated by a holographic method in view of the technological difficulties. The device according to the invention does not use the effect of Bragg diffraction, but utilizes interference of light beams formed by a great number of reflectors. The interference proceeds in high interference orders, i.e. the phase difference between adjacent beams exceeds number $2\pi$ by many times (about 10). This allows to provide a much greater spacing (5–10 μm) of arrangement of unit reflectors 4, than the spacing of grooves of the diffraction grating of the holographic beam expander. For this reason, the claimed device is more manufacturable. The different physical nature of the two compared types of beam expanders results in that they are described using different terms, and have different physical properties. In particular, for typical structures of these devices, inclination and shape of the stripes will be basically different. A holographic beam expander requires the sinusoidal surface corrugation whose grooves are inclined at Bragg angle with respect to the incident beam. The claimed device requires the narrow vertical ruling having the groove inclination that is determined by the ruling arrangement spacing, but in any case it is several times (about 10 times) greater than Bragg angle designed for the operating light wavelength.

Operation of the claimed beam expander can be illustrated by an example of description of behaviour of the reflected wave's optical field in the form of its angular spectrum in the waveguide plane. The resulting angular spectrum U(p) radiated by the beam expander is described as follows. For simplicity, below follows description of the transverse distribution of electric field of the guided (waveguiding) mode as $\exp(-(y/w_0)^2)$ is chosen, where $w_0$ is effective width of stripe waveguide, y is transverse coordinate (in the plane of planar waveguide 2). Each reflector 4 has width 2w, and described by constant reflectance R and phase shift $kx_m$, where $x_m$ is coordinate of m-th reflector. Assuming that reflectors 4 are arranged strictly periodically with pitch d:

$$x_m = dm \quad (2)$$

Then U(p) can be expressed as follows:

$$U(p) = \sum_{m=1}^{M} u_o(p) rt^{m-1} \exp(-ikpx_m), \quad (3)$$

where $r=R^{1/2}$, $t=(T)^{1/2}$, $T=1-R$, p is sine of observation angle as measured with respect to the axis that corresponds to direction of the beam reflected from a unit reflector; $u_0(p)$ is angular spectrum radiated by a unit reflector.

$$u_o(p) = C \int_{-w}^{w} \exp(-ikpx - (x/w_o)^2) dx, \quad (4)$$

where C is normalization constant.

For simplicity, it is assumed that $w/w_0$ ratio is much more than unity, then the following expressions can be derived:

$$u_0(p) = Cw_0(\pi)^{1/2} \exp(-(kwp/2)^2, \quad (5)$$

$$u(p) = (\pi)^{1/2} w_0 \exp(-(kwp/2)^2) r(1-t^{(M-1)} \exp(-ikpdM)/(1-t \exp(-ikpd)) \quad (6)$$

Angular distribution of the expanded beam intensity will be represented as follows.

$$1(p) = |u(p)|^2 = C^2 \pi \exp(-(kwp)^2/2 \times ((1-t^{M-1})^2 + 4t^{M-1} \sin^2(kd(1-p)M-1)/2)/((1-t)^2 + 4t \sin^2(kd1-p)/2)) \quad (7)$$

The radiated spectrum of the beam expander when $\lambda_0=1.54$ μm, is shown in FIG. 3 for constant reflectance R=0.002 (curve 7). It has a very narrow peak about 0.0001 radian wide. In analysis it was assumed that N=2.2, unit reflectors 4 are arranged strictly periodically with spacing of d=7 cm, number of reflectors is M=1000, total length of the reflectors' structure dM=0.7 μm, effective width of stripe optical waveguide $w_0=10$ μm. Curve 8 corresponds to the case when unit reflectors 4 are implemented with alternating (different) reflectance whose value decreases from the middle portion of stripe optical waveguide 3 to its ends; in this case—according to truncated Gaussian function: $r(i)=r \exp[5((i-500)/1000)^2]$. Curve 8 is derived by numerical integration of relationship (3), taking into account that r and t depend on serial number of reflector (i). It is obvious that owing to implementation of unit reflectors 4 with alternating reflectance whose value decreases from the middle portion to ends of a stripe optical waveguide, an essential suppression (over 20 dB) of sidelobes of directivity pattern of the outputted optical radiation can be attained.

Position of the angular spectrum maximum of the claimed beam expander is determined as follows:

$$kd(1-p) = 2\pi m_\lambda \quad (8)$$

where $m_\lambda$ is interference order (integer). This maximum corresponds to the interference order $(m_\lambda)$ for which the propagation direction is very proximate to the mirror reflection (p=0) from the unit reflectors. For our case $m_\lambda=10$ when $\lambda_0=1.54$ μm.

Thus arrangement of reflectors 4 is selected according to equation (8) when p=0. This complies with the condition that at the operating optical radiation wavelength the direction of propagation of one of interference orders $(m_\lambda)$ and that of the mirror-reflected beams practically coincide. In other words it means that inclination angle and position of unit reflectors 4 are selected such that, on the operating light wavelength, phase difference for the beams reflected from different unit reflectors is essentially multiple of $2\pi$.

Further, according to (8), directivity pattern of expanded beam shifts as a whole (scans) when the light wavelength change, as follows:

$$p = (\lambda_m - \lambda)/\lambda_m \quad (9)$$

where $\lambda_m = dN/m_\lambda$.

The radiation beam expander according to the invention has minimal dimensions (in our example: the operating field is equal to 0.002×0.7 cm$^2$) and, simultaneously, a low divergence (about 0.0001 radian) of the outputted optical radiation whose directivity pattern scans as the optical radiation wavelength varies.

Industrial Applicability

The radiation beam expander according to the invention can be suitably used as collimating or selecting elements in various integrated optical circuits. Further, the property of the beam expander to change the radiation direction as the light wavelength varies, can be of use in designing optical tunable filters for the wavelength-division multiplexing (WDM) systems applied in fiber-optic communication. The beam expander can be fabricated according to the known manufacturing techniques developed for the integrated optics and microelectronics devices.

What is claimed is:

1. A radiation beam expander, comprising planar optical waveguide (2) and a beam expanding means in the plane of planar waveguide (2), which means is arranged on the path of radiation beam (6), characterized in that the beam expanding means is implemented in the form of stripe waveguide (3) provided with a set of unit reflectors (4) that overlap its aperture, and is arranged in the plane of planar waveguide (2), within said waveguide itself or in the vicinity thereof, with providing the possibility of passing of radiation beams (6'), reflected by unit reflectors (4), into planar waveguide (2), angle of inclination and arrangement of unit reflectors (4) being selected such that phase difference on the operating radiation wavelength, for any pair of beams (6') reflected from different unit reflectors (4), is essentially multiple of $2\pi$.

2. The beam expander as claimed in claim 1, characterized in that unit reflectors (4) have different reflectance whose value decreases from the middle portion of strip waveguide (3) towards its ends.

3. The beam expander as claimed in claim 1, characterised in that angle of inclination of unit reflectors (4) with respect to longitudinal axis of stripe waveguide (3) is essentially 45°.

* * * * *